US010369924B2

(12) United States Patent
Peacock

(10) Patent No.: US 10,369,924 B2
(45) Date of Patent: Aug. 6, 2019

(54) VEHICLE WARNING LIGHT SYSTEM

(71) Applicant: Travis Peacock, Cincinnati, OH (US)

(72) Inventor: Travis Peacock, Cincinnati, OH (US)

( * ) Notice: Subject to any disclaimer, the term of this patent is extended or adjusted under 35 U.S.C. 154(b) by 0 days.

(21) Appl. No.: 15/606,547

(22) Filed: May 26, 2017

(65) Prior Publication Data
US 2017/0349093 A1 Dec. 7, 2017

Related U.S. Application Data

(60) Provisional application No. 62/353,212, filed on Jun. 22, 2016, provisional application No. 62/346,693, filed on Jun. 7, 2016.

(51) Int. Cl.
| | | |
|---|---|---|
| *B60Q 1/46* | (2006.01) | |
| *B60Q 1/00* | (2006.01) | |
| *B60Q 1/26* | (2006.01) | |
| *B60Q 1/30* | (2006.01) | |

(52) U.S. Cl.
CPC ............ *B60Q 1/46* (2013.01); *B60Q 1/0088* (2013.01); *B60Q 1/2611* (2013.01); *B60Q 1/305* (2013.01); *B60Q 2900/10* (2013.01)

(58) Field of Classification Search
CPC ...... B60Q 1/46; B60Q 1/0088; B60Q 1/2696; B60Q 1/2611
USPC .......................................................... 340/471
See application file for complete search history.

(56) References Cited

U.S. PATENT DOCUMENTS

| | | | | |
|---|---|---|---|---|
| 5,701,116 | A * | 12/1997 | Hoekstra ................ | B60Q 1/305 307/10.1 |
| 6,087,777 | A * | 7/2000 | Long ...................... | A01B 59/00 315/77 |
| 2005/0083706 | A1* | 4/2005 | Kesterson ................ | B60Q 1/20 362/508 |
| 2006/0087413 | A1* | 4/2006 | Lee ......................... | A01K 15/02 340/431 |
| 2008/0224708 | A1* | 9/2008 | Mannerfelt ............ | B60Q 1/305 324/414 |
| 2011/0287637 | A1* | 11/2011 | Workman ................ | B60D 1/62 439/35 |
| 2015/0306928 | A1* | 10/2015 | McCollum ............ | B60T 13/662 340/431 |

* cited by examiner

*Primary Examiner* — Jack K Wang
(74) *Attorney, Agent, or Firm* — Jenei LLC; Stephen Jenei

(57) ABSTRACT

The present disclosure pertains to a vehicle warning light system for a vehicle having factory or original equipment manufacturer (OEM) lights. The system provides for inputs and outputs corresponding to the factory lights of the vehicle. The flasher system is configured such that the flasher system operates independently of the vehicle wherein that factory lights are independently controlled by the factory controls.

9 Claims, 5 Drawing Sheets

VEHICLE WARNING LIGHT SYSTEM

PRIORITY AND CROSS-REFERENCE TO RELATED APPLICATIONS

This application claims the benefit of U.S. Provisional Application No. 62/353,212, entitled "VEHICLE WARNING LIGHTING SYSTEM" and filed Jun. 22, 2016 and U.S. Provisional Application No. 62/346,693, entitled "VEHICLE WARNING LIGHTING SYSTEM" and filed Jun. 7, 2016, the contents of which are hereby incorporated by reference in their entirety.

BACKGROUND

1. Technical Field

The present disclosure generally relates to information handling systems and in particular to electrical circuitry for vehicle exterior lighting, and more particularly to emergency warning light systems.

2. Description of the Related Art

The visual light signals on law enforcement vehicles, emergency vehicles, tow trucks and the like are used for increasing the visibility of these vehicles to motorists and pedestrians in emergency and traffic control situations. For example, the original equipment manufacturer (OEM) or factory lights on the front and rear of certain law enforcement and emergency vehicles (installed by the vehicle manufacturer) may be programmed to display a number of different emergency signals in a variety of different patterns and colors, i.e., intermittent flashing at various time intervals.

In addition, there are various lighting systems such as light bars that may be added to the vehicle to provide different emergency signals and color patterns. Light bars may be mounted to the exterior roof or top of the emergency or law enforcement vehicles and/or within the interior of these vehicles such that they are visible through the front, side or rear windows.

Generally, light bars may be illuminated by utilizing light sources, such as a plurality of light emitting diodes (LEDs) or halogen lamps to produce different light signals. These light signals may include different colors and/or illumination patterns. The variety of light signals, colors and patterns are useful for generating different visual displays depending on the particular traffic control or emergency situation. As a result, motorists or pedestrians approaching these vehicles may easily view the light display and understand the particular traffic control or emergency situation based upon the signal, color or pattern being displayed.

It is well known that most new vehicles are controlled by a series of body control modules (BCM's) linked to a controller area network (CAN) electrical or BUS system. CAN electrical systems began to appear in most new vehicles in the early 2000s and now virtually all passenger vehicles sold in the United States are equipped with CAN electrical systems. The CAN electrical system allows various modules and systems within the vehicle to share data and interact. In more detail, the CAN system is a communication standard that allows the various modules and computers in a vehicle to communicate with one another via a common data bus circuit in the wiring system. Namely, the powertrain control module (PCM), anti-lock brake system, electronic steering and suspension, automatic climate control system, keyless entry system, lighting control modules and other systems are interconnected electronically through the CAN system. In turn, the CAN system is linked to a central computer or main BCM within the vehicle.

The most common way to connect a light bar or other after-market illumination system to a vehicle or to program the existing lighting system installed by the OEM vehicle manufacture to display emergency signals is to connect with the harness emanating from one of the individual BCM's. However, the emergency lighting may not work with the exterior lighting of vehicle, i.e., the emergency vehicle lighting will not function at night when the vehicle's headlights are on or the brake or turn signals lighting are not visible if the emergency lighting is activated.

It is possible to run separate power from the battery or power distribution block to each piece of equipment that needs to be installed. However, this is a tedious process, which requires connecting each piece of additional equipment to the battery or power distribution block. Notwithstanding the time-consuming nature of this process, it does not allow one to tap into power anywhere in the OEM harness, such as headlights or taillights without creating similar problems to the ones mentioned above. Moreover, in certain manufacturer's model vehicles, it not possible to operate a flashing sequence for the headlights while holding the high beam shutters open or disengage the flashing sequence when the driver applies the brakes or turn signals.

Accordingly, there is a need for a flasher vehicle interface system that operates factory lighting systems installed by the OEM as well auxiliary after-market lighting systems.

BRIEF SUMMARY

The present disclosure provides a vehicle warning lighting system (VWLS) including a flash module having a plurality of light power outputs that each provides a strobed light power signal. A VWLS interface includes an isolating interconnection inserted between each one of the plurality of light power outputs of the flash module and an interrupted conductor in a vehicle between a body control module and a respective exterior light. The isolating interconnection allows a light power signal from the BCM to the respective exterior light and a strobed light power signal from the flash module to the respective exterior light while isolating the BCM and flash module from each other. A flash module user control is in electrical communication with the flash module to enable the strobed light power signal.

In one aspect, the present disclosure provides a method of installing a vehicle warning lighting system on a vehicle. In one or more embodiments, the method includes, for each of a plurality of exterior light circuits in a vehicle, inserting in an electrical conductor a one-way diode in series with conductor union between a BCM and at least one of more than one exterior vehicle light. For each of the conductor unions, the method includes electrically connecting a respective output of a flash module (FM) to a respective conductor union via a one-way diode. Each one-way diode allows a light power signal to illuminate the one exterior vehicle light from either BCM or FM while presenting a high input impedance to prevent BCM and FM from interfering with each other. The method includes mounting a flash user control that is accessible to the user of the vehicle. The method includes electrically connecting the flash user control to a control input of the FM. The method includes electrically connecting a power input of the FM to battery power of the vehicle.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
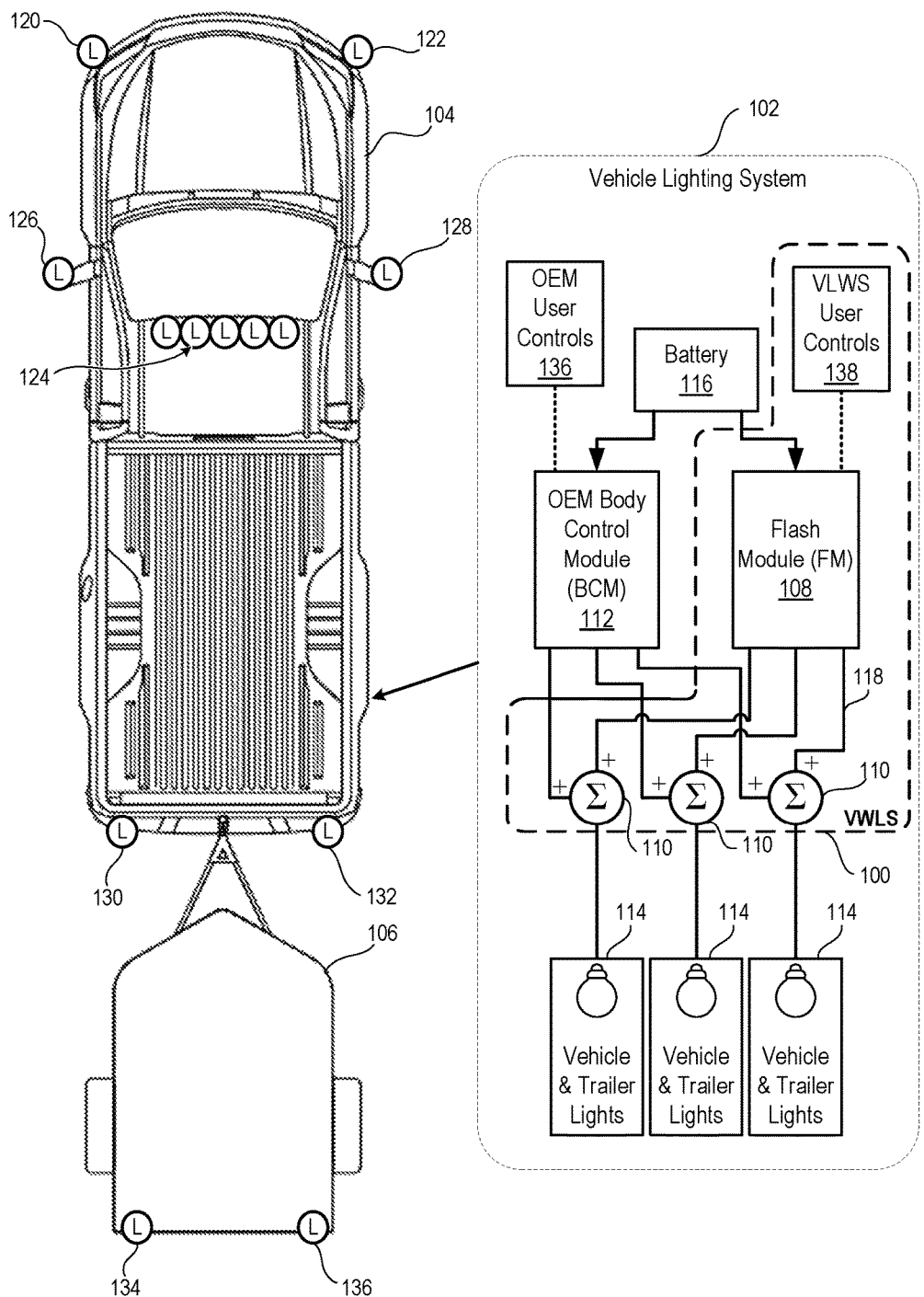
FIG. 1 illustrates an top view of a vehicle and trailer along with a diagram of a vehicle light system having a vehicle warning light system (VWLS) added, according to one or more embodiments.

The present innovation relates to methods, vehicles, and systems for providing warning lights using the configured lighting systems of the vehicle. In one aspect, the method may include establishing at least one visible signal configured to provide a signal during a normal state of a vehicle. In another embodiment, the vehicle may include at least one lighting device configured to provide a signal during a normal state of a vehicle, and a processor configured to detect the state of the vehicle and initiate a visible nuisance via the at least one visible signal.

This disclosure relates to lighting for vehicles and, more particularly, to a flasher vehicle interface module that functions independently of the vehicle's controller area network (CAN) electrical system and other body control modules (BCM's) for providing emergency and warning lighting by flashing different selectable lighting patterns via the vehicle's factory headlights and tail lights as well as powering additional after-market and accessory lighting through the module.

In accordance with one aspect of this disclosure, a flasher interface module for a vehicle having factory lights is provided. The flasher interface module includes a plurality of input and output ports corresponding to the factory lights of the vehicle and a plurality of leads corresponding to each of the input and output ports. The input and output ports of the module operate independently of the vehicle such that factory lights operate independently.

In one or more embodiments, the flasher interface module may be capable of operating the factory lights in multiple different flash patterns. The module may further have an auxiliary circuit for powering an after-market lighting system installed in the vehicle. In various other embodiments, the system may have an override feature that automatically shuts off the module when a high beam light on the vehicle is activated, when a brake light on the vehicle is activated or when a turn signal light on the vehicle is activated.

A further aspect of the disclosure is a method of installing a flasher interface module in a vehicle having factory lights to operate the factory lights independent of a CAN system and a plurality of body control modules. The method may further include the steps of configuring the module to operate an after-market lighting system for the vehicle and installing a second flasher interface module in the vehicle.

The vehicle may generally include, without limitation, any motorized vehicle including watercraft. Vehicle may be powered by an internal combustion engine, electrical motor, fuel cell, or any other engine for providing motive force to the vehicle. As will be described further below, exemplary, visual warnings may be especially beneficial in applications where vehicle does not exhibit significant outward telltale signs that the vehicle is running or otherwise active, e.g., hybrid or electric vehicles, or vehicles that are otherwise relatively quiet and free of vibrations during operation.

Generally, urgent illumination warnings provided by the vehicle are contemplated to include visual warnings that provide an alert or alarm to a vehicle operator, passengers, or bystanders. Accordingly, exemplary illumination warnings may generally be differentiated from notifications or signals typically associated with normal vehicle operation. In some examples, exemplary illumination warnings may be provided by lighting devices, which are employed for other purposes during normal operation of the vehicle, e.g., exterior turn signals, interior lights, headlights, etc. In such examples, an illumination of the lighting device(s) associated with an urgent warning may be different from an illumination of the device(s) as part of the normal operation of the vehicle. For example, urgent illumination warnings may be differentiated from the normal operation illumination such that there is a perceptible difference in at least one of a brightness, a color, and a pattern of the visible nuisance compared with the group of normal vehicle notifications.

In some embodiments, the visual warnings may rise to a level of a nuisance to a vehicle operator, occupants, or bystanders, and may thus be differentiated from the normal illumination associated with the vehicle on that basis as well. For example, a very rapid, irregular, bright, or otherwise intrusive flashing of vehicle lighting devices that is atypical of normal vehicle operation may serve to warn bystanders, occupants or a vehicle operator of a dangerous condition. Such indicators may need to follow regulatory restrictions, by country, state, or municipalities on the color, brightness, and vehicle operation mode in which these methods can be utilized. For example, there are existing Federal Motor Vehicle Safety Standards (FMVSS) restrictions on the use of white light facing rearward with respect to a vehicle, or light patterns that can be mistaken for emergency vehicles. In some exemplary approaches, urgent illumination warnings are provided around an exterior of the vehicle such that they may be perceived readily by bystanders, pedestrians, or others not inside the vehicle. In other examples, illumination warnings may be provided to the interior of the vehicle where an urgent warning to a vehicle operator or occupants of the vehicle is desired. Moreover, internal and external urgent warning notifications need not be exclusive. In fact, in some cases multiple lighting devices may be activated to provide an urgent illumination warning.

In one aspect the invention, the system provides for a vehicle warning light system (VWLS) that allows access all existing wiring to all existing lights on a vehicle to create a switched universal 360° integrated strobing feed. Existing lights include, but are not limited to, headlights, turn signals, brake lights, running lights, cab or "clearance" lights, Department of Transportation lights, or any other factory installed lights. The result is that every light at all four corners of a vehicle—in addition to all mirror lights, cab lights, running boards, and light strips—all illuminate in a synchronized alternating strobe pattern providing new capabilities for drastically improved and enhanced visibility of vehicles over existing warning light system designs.

In addition the same result can also be achieved with any attached implement; including any trailer, snow plow, utility, or any other after-market vehicle "upfit" and/or add-on. Such attached implement will possess a matching synchronized strobing pattern that never leaves the vehicle dark as one side of the vehicle is always illuminated. This new design provides new capabilities and drastically enhances visibility to any vehicle or attached accessory over all previous designs. In one or more embodiments, this new design provides for use on vehicles with internal body frames of electrically conductive materials such as aluminum, steel, titanium, and other metals and alloys.

This design can be incorporated into all existing motor vehicles and all new vehicles by retrofitting to components currently installed and existing on virtually all motor vehicles in circulation. The VWLS is a design that utilizes the existing wiring that exits the Body Control Module (BCM) and delivers power and commands to the outdoor lighting bulbs located on the vehicle. These lights include the headlights, the front and back and turn signals, the rear lights and braking lights, side mirror lights, running lights, cab or "clearance" lights, hazard lights, or any exterior light that illuminates on the exterior of any vehicle.

To accomplish a synchronization of the strobing pattern to all existing lights referenced above the design incorporates a separate flasher vehicle interface module or "Flash Module," (FM) which receives power directly from the battery. The FM outputs are spliced directly into the BCM output wires, which provides for the integration of the strobing pattern to all existing light bulbs.

The flasher interface module is designed to flash the factory headlights and tail lights as well as powering after-market and accessory lighting systems in multiple different flash and color patterns. In one or more embodiments, the flasher interface module may be installed in the front or rear of the vehicle for operating the headlights and taillights, respectively, and certain modules may be inserted into either the front and/or rear of the vehicle.

The flasher interface module further includes a harness including a plurality of leads or wires for each of the plurality of input and output ports. These leads may be color-coded and/or labeled/numbered as well as being cut to the proper length to allow for quick and easy installation. The leads may be soldered onto the board and potted in black epoxy before the cover is installed to improve reliability and reduce the possibility of corrosion on the terminals. In another embodiment, the leads may be connected to the board by plugs on the terminal. A standard industry flasher is typically equipped with a four wire, six-inch long pigtail of wires consisting of a hot, ground (GND), output and pattern select wire.

In one or more embodiments, the OEM headlight/taillight modules and after-market lighting in the front and rear of the vehicle can be operated with one flasher interface module for the front and one flasher interface module for the rear. In one or more embodiments, the system uses only light emitting diode (LED) bulbs. In one embodiment, to be integrated into the strobing pattern, all existing non-LED bulbs are replaced with LED bulbs.

INSTALLATION: The design and components are retrofitted to existing vehicles as set forth below:

Four corner Lights: First the wires running to the four corners of the vehicle must be connected to the FM. Exiting the BCM are four wires each of which travel to one separate corner of the vehicle. In one or more embodiments, the voltage capacity traveling from the BCM wires to the four corners is 1-52 volts. In one or more additional embodiments, the voltage capacity traveling from the BCM wires to the four corners is 2-24 volts. In one or more embodiments, the voltage capacity traveling from the BCM wires to the four corners is 4-12 Volts.

In addition, the design taps into an existing power source originating directly from the battery in the form of a wire with a switch. The voltage capacity coming from this battery power source is also at least 1, 2, 3, 4, 5, 6, 7, 8, 9, 10, 11, or 12 volts or more. In one embodiment, the voltage capacity coming from this battery power source is also at most 120, 110, 52, 48, 40, 30, 24, 18, 12 volts or less. The FM must be grounded. In one embodiment, the output voltage of the flash module is 1-52 volts. In one or more additional embodiments, the voltage output from the FM is 2-24 volts. In one or more embodiments, the voltage output from the FM is 3-12 volts. In one or more embodiments, the voltage output from the FM is at least 1, 2, 3, 4, 5, 6, 7, 8, 9, 10, 11, or 12 volts or more. In one or more embodiments, the voltage output from the FM is at most 48, 40, 30, 24, 18, 12, 8, or 6 volts or less. In one or more embodiments, the output capacity of the FM flashing signals is 4.8V. As such, the maximum voltage capacity of the flashing program signals leaving the FM is 4.8V.

The 12V wire running from the switch is then run directly into the FM. From some of the existing output terminals on the FM a wire is run to each of the 4 individual wires exiting the BCM. At the BCM wires, each FM wire exiting the output terminal is spliced onto a single corresponding wire exiting the BCM. At this juncture a union is used to attach the output wire exiting the FM to the wire exiting the BCM. In addition to a union, a one-way diode is placed on the wire exiting the output of the FM, and such diode is located between the FM and before the union. Another one way diode is placed on each wire exiting the BCM and such diode is located on the wire between its exit from the BCM and the union with the wire exiting the FM. Based upon this design, the capacity of the wire exiting the BCM remains at 12V. The capacity of the voltage exiting the FM is 4.8V— the capacity of the FM. At this point assembly and retrofitting the wiring to the 4 corners of the vehicle is complete.

Side Mirrors: Using an output wire from the flash module, splice it to an output wire from the BCM with the same configuration as above; i.e., a diode between the output and the union (as shown in FIG. 1). At this point the two side mirror wires are connected and the side mirrors are integrated into the universal strobing pattern.

Cab or "Clearance" Lights: Using the same configuration as above attach each of the cab lights by splicing the wire exiting the BCM with the wire exiting the FM with a diode placed at each output before the union. Attached Implement or Trailer: To retrofit to an attached trailer simply run a wire from a separate output terminal located on the FM to the trailer running light system.

OPERATION: To activate the illumination of the strobing patterns from the FM, turn on the power from the 12V switch. At this point a 4.8V signal from the FM programs will travel from the output terminals on the FM at 4.8V down past the unions and out into the bulbs existing at the 4 corners of the vehicle; side mirrors, cab lights, and attached implement lights on a coordinated universal strobing pattern. The FM can be set to illuminate various strobing patterns built into the FM.

This design does not interfere with the normal functioning of the lights, brake lights, and turn signals; all of those functions are powered by a 12V power source exiting the BCM. If the FM switch is on and a brake light is activated, the 12V signal from the brake light will override the 4.8V signal from the FM. The one-way diodes prevent any voltage from reverting back up the circuit and causing interference.

Accordingly, urgent visual warnings may be provided in a manner that is more easily perceived, e.g., by illustrating movement. Accordingly, urgent illumination warnings may be made more effective to the extent they are more intrusive or otherwise grab attention of vehicle occupants or pedestrians outside the vehicle.

In still other exemplary approaches, other vehicle lighting may be provided to indicate an urgent illumination warning. Merely as examples, special lighting patterns on external illumination currently utilized to provide turn signaling for the vehicle, special lighting patterns on running lights headlights, tail lights, fog lights ground lighting, door handle lighting of vehicle may be used to alert passerby or pedestrians on the outside of the vehicle. Additionally, special lighting patterns on interior lighting, cluster lighting, map lighting, dome lighting, or other available sources of illumination in the interior of the vehicle may be used to alert occupants of the vehicle of an urgent illumination warning.

Side mirror mounted signaling may also be utilized in a manner similar to hazard lighting, whereby it flashes in manner to draw attention that vehicle status ought to be checked. For example, a pattern of flashing either identical to hazard lighting or distinctly different from that and that of turn signaling may be employed. Additionally, alternate light colors may be utilized, and/or individual bulbs can be utilized in unique patterns or timing.

In another example, activation of external lights may be executed in a manner that rotates around the car or in another pattern designed to quickly signal an urgent warning that a status of the vehicle might be in an emergency mode. Similarly, such an approach might be performed or involve use of interior lighting and unique colors or patterns designed to provide quickly visible indication to both external and internal persons that vehicle, electrical usage, powertrain, or engine may remain enabled, vehicle usage may remain authorized, accessory mode active, etc.

In some exemplary approaches, the exemplary methods described herein may employ a computer or a computer readable storage medium implementing the various methods and processes described herein. In general, computing systems and/or devices, e.g., a processor of the vehicle, or any remote or mobile device described herein Turning to the Drawing, FIG. 1 illustrates a Vehicle Warning Lighting System (VWLS) installation kit 100 added to an OEM vehicle lighting system 102 of a vehicle 104 that tows a trailer 106. The VWLS installation kit 100 includes a flash module 108 and power adders 110 that combine light power signals output by both of the FM 108 and an OEM Body Control Module (BCM) 112 of the OEM vehicle lighting system 102. In one embodiment, the power adders 110 pass a light power signal from the BCM 112 when present and otherwise pass a light power signal from the FM 108. In one embodiment, the power adders 110 combine the two light power signals. For example, an amount of additional limitation provided by the FM 108 may be insignificant as compared to the OEM light power signal. For example, a brake light can be set to a maximum illumination that a light device can produce or the additional pattern of strobing lights overlaid on a high illumination level does not impair the primary function of the brake light.

For clarity, the vehicle light system 102 has only three lights 114 supplied respectively by three power adders 110, which in turn each receive inputs from a respective power conductor or wire 118 from the BCM 112 and FM 108. However, the vehicle 104 can have more lights, such as left and right front lights 120, 122, cab lights 124, left and right side lights 126, 128, left and right rear lights 130, 132, and left and right trailer running lights 134, 136. The vehicle light system 102 has a battery 116 that powers the BCM 112 and FM 108, although the vehicle 104 can be providing electrical power from a generator (now shown). VWLS installation kit 100 can include VWLS user controls 138 to enable VWLS operation and can further select a desired pattern or intensity. The vehicle light system 102 has other user and automatic controls 140 for turning on the various lights 120, 122, 124, 126, 128, 130, 132, 134, 136.

In an exemplary embodiment, the FM 108 is The ULF44, which is a UNIVERSAL® Halogen & LED flasher distributed by Whelen Engineering Co., Inc. (www.whelen.com), which is a Four Outlet, Four Channel LED Flasher designed for use with LED or Super-LED lightheads. Output is 5 amps/60 Watts per Channel and is short circuit and thermally protected. 62 Scan-Lock Flash Patterns, Allowing for Alternating, Simultaneous and Synchronized Flashing Lightheads. Input controls include Scan-Lock and synchronization. Encapsulated design for water resistance and rugged performance. Additional information is provided in U.S. Reissue Pat. No. 38,795 E1, the disclosure of which is hereby incorporated by reference in its entirety.

Figure 2:
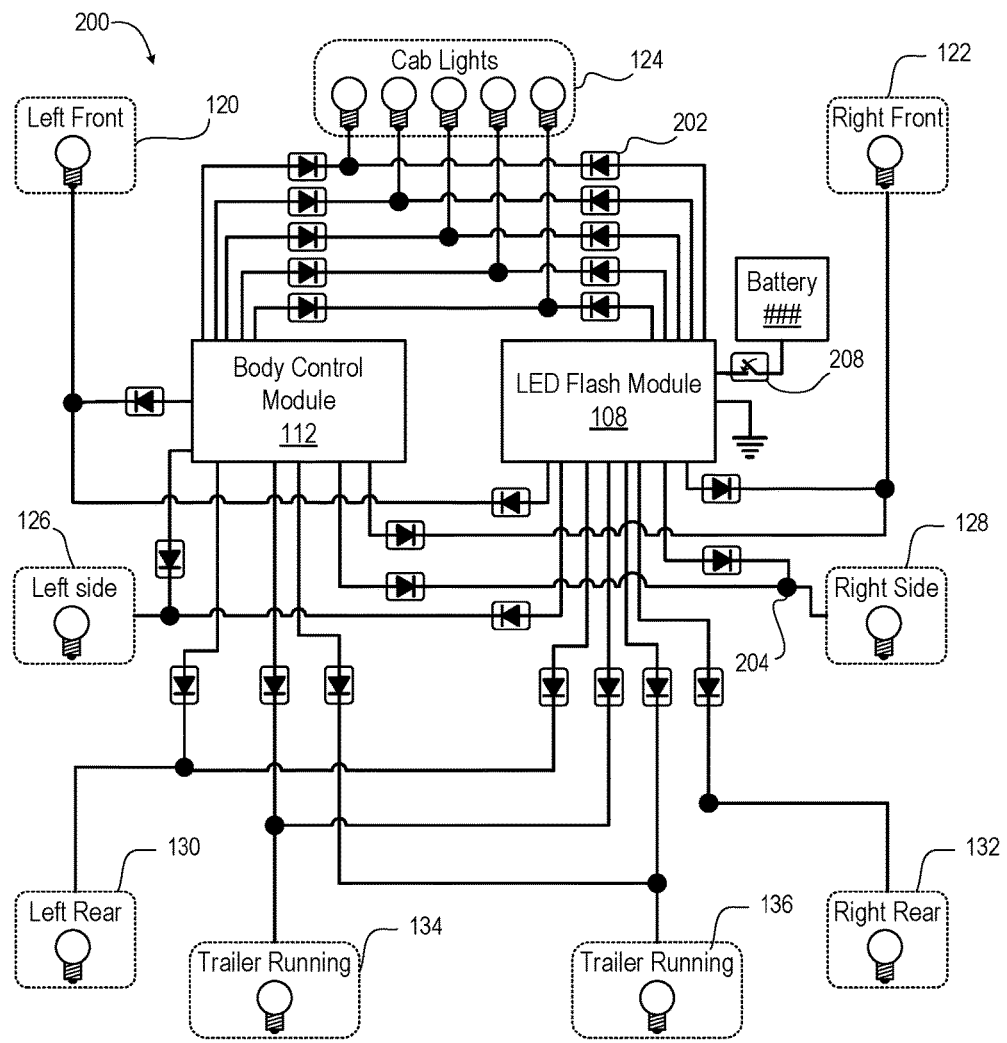
FIG. 2 illustrates a block diagram of example isolating interconnections between VWLS and the vehicle light system, according to one or more embodiments.

FIG. 2 illustrates interconnections of an example vehicle light system 200 in which the power adders 116 (FIG. 1) wherein each OEM conductor wire between the BCM 112 and a respective light 120, 122, 124, 126, 128, 130, 132, 134, 136 include a one-way diode 202 connected to a union connector 204. A corresponding conductor wire 206 from the FM 108 includes a one-way diode 202 connected to the respective union connector 204. The diodes 202 prevent the BCM 112 and FM 108 from interfering with each other. User controls 208 can be a two-position ON/OFF switch.

Figure 3A:
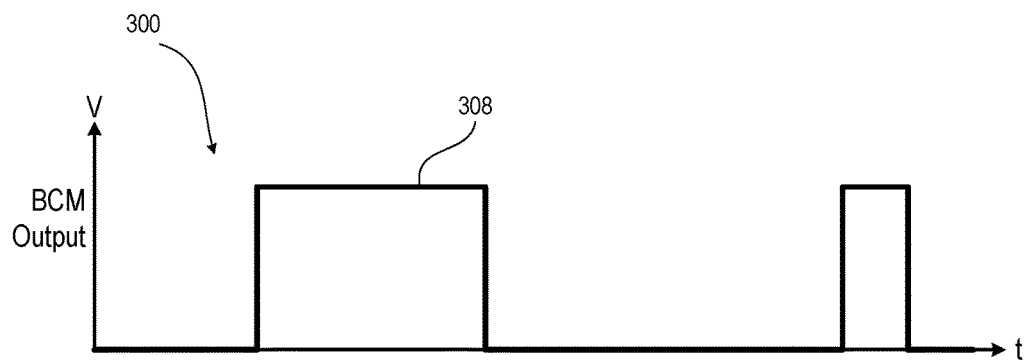
FIGS. 3A-3C illustrate respectively graphical plots of output of a Body Control Module (BCM) of the vehicle light system, output of a Flash Module (FM) of the VWLS, and a combined power signal that illuminates a corresponding vehicle exterior light, according to one or more embodiments.
Figure 3B:
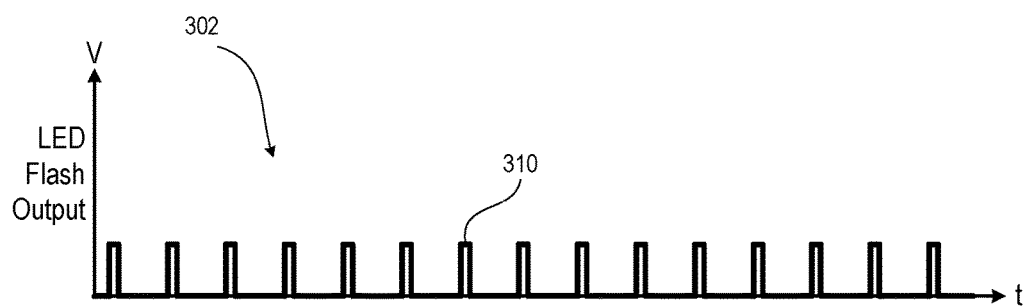
Figure 3C:
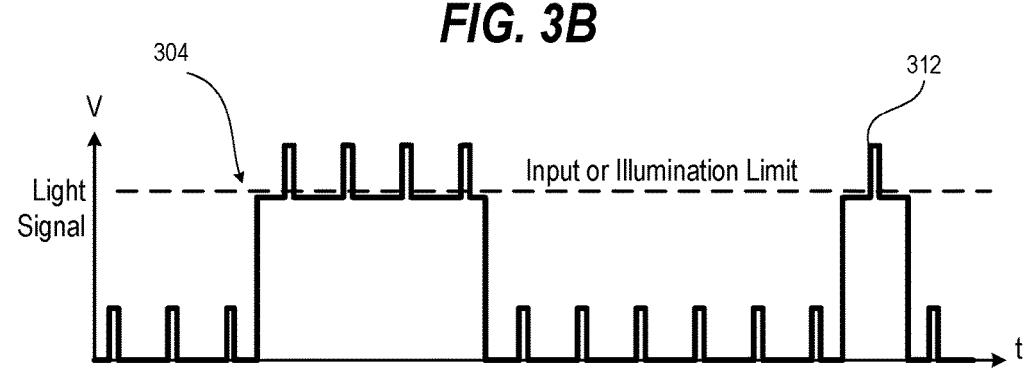

FIGS. 3A-3C illustrate graphical plots 300, 302, 304 respectively a light power signal 308 from the BCM received at one input to a power adder, a VWLS power signal 310 from the FM received at another input to the power adder, and a combined power signal 312 that is output from the power adder and used to illuminate a selected light. In one or more embodiments, the VWLS power signal 310 is of relatively short duration and low amplitude as compared to the light power signal 308. The flashes would be readily understood as to having a function other than the normal operation of the respective light. When the OEM usage of the light is mandated by the light power signal 308, the VWLS power signal 310 does not interfere with this function as illustrated by the combined power signal 312.

Figure 4:
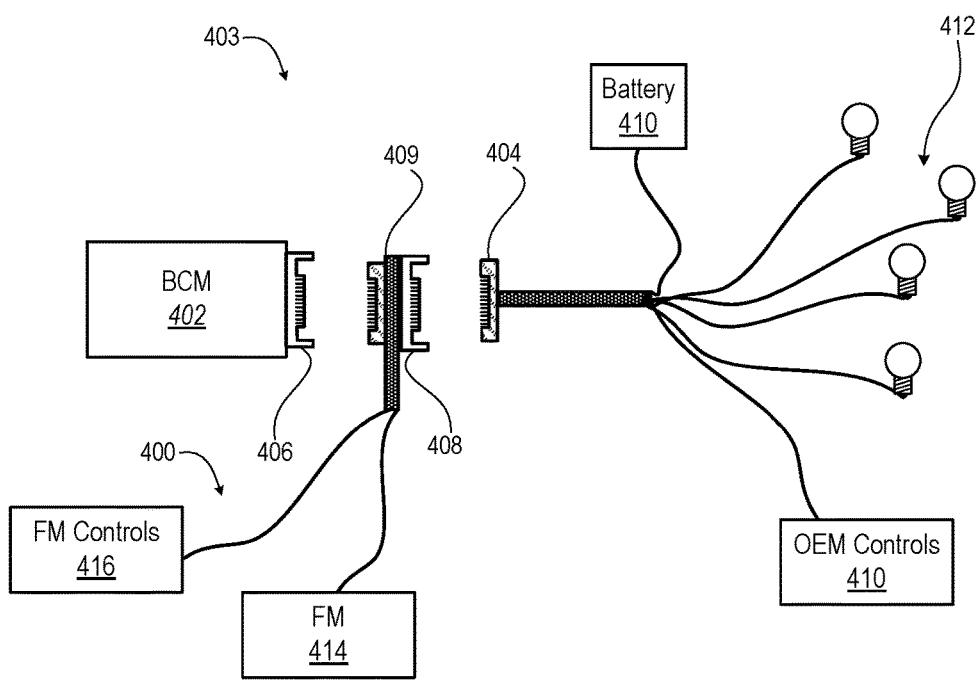
FIG. 4 illustrates a modular VWLS adapter configured to readily incorporate VWLS functionality between a receptacle of a particular BCM and a wire bundle connector that nominally mates with the receptacle in accordance with one or more embodiments.

FIG. 4 illustrates an example VWLS retrofit kit 400 that is configured for a particular type of BCM 402 and light system 403. An OEM connector 404 is disengaged from a receptacle 406 of the BCM 402. A VWLS adapter connector 408 mates to both the receptacle 406 and the OEM connector 404 and thereby provides one-way diode isolation circuitry 409 and nominal operational functions of the BCM 402, including maintaining power connection to battery 410 and lights 412. The VWLS adapter connector 408 is electronically coupled to FM 414 and FM user control 416 that can be remotely placed for operator use.

Figure 5:
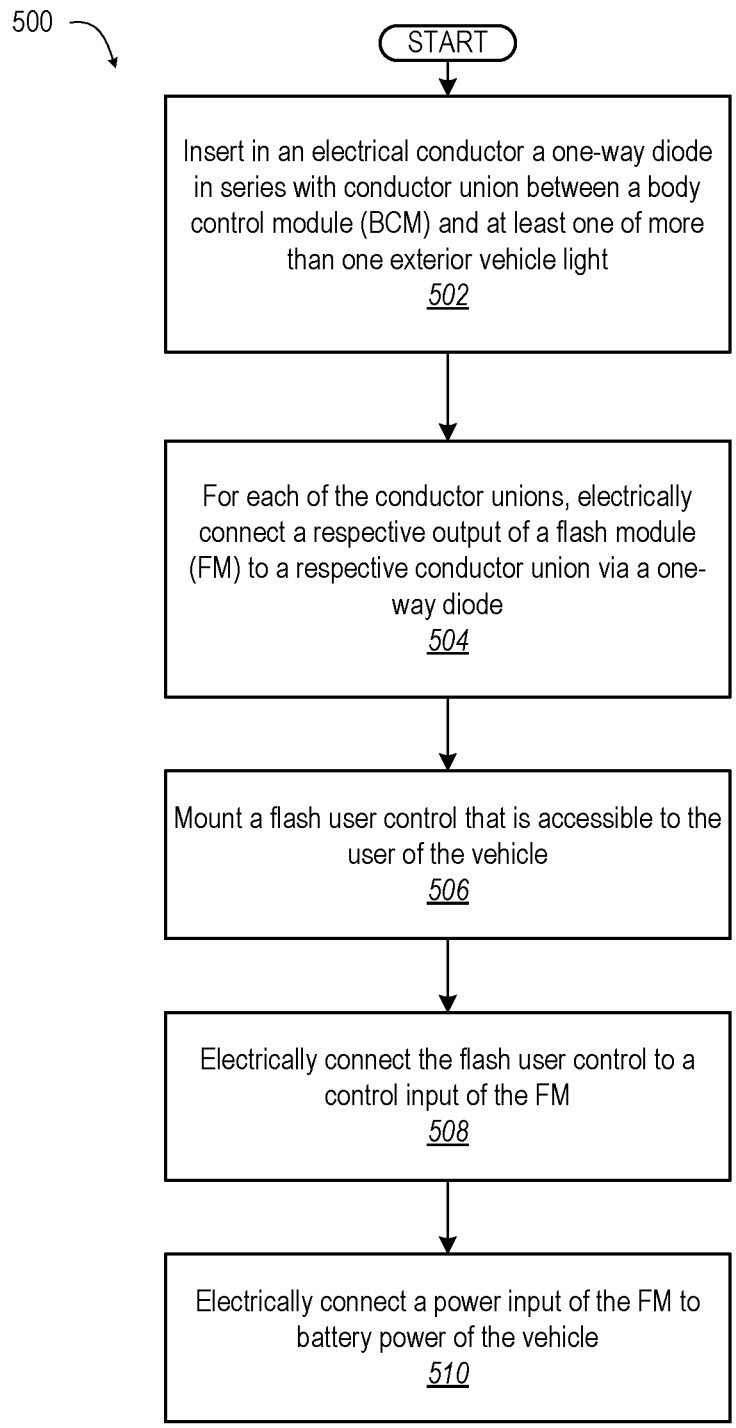
FIG. 5 is a flow chart illustrating a method retrofitting a VWLS into a vehicle light system, in accordance with one or more embodiments.

FIG. 5 illustrates a method 500 of adding VWLS functionality to an existing vehicle light system. In one or more embodiments, for each of a plurality of exterior light circuits in a vehicle, the method 500 includes inserting in an electrical conductor a one-way diode in series with conductor union between a body control module (BCM) and at least one of more than one exterior vehicle light (block 502). For each of the conductor unions, the method 500 includes electrically connecting a respective output of a flash module (FM) to a respective conductor union via a one-way diode (block 504). Wherein the one-way diodes allows a light power signal to illuminate the one exterior vehicle light from either BCM or FM while presenting a high input impedance to prevent BCM and FM from interfering with each other. The method 500 includes mounting a flash user control that is accessible to the user of the vehicle (block 506). The method 500 includes electrically connecting the flash user control to a control input of the FM (block 508). The method 500 includes connecting a power input of the FM to battery power of the vehicle (block 510).

In the above-described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

In the detailed description of exemplary embodiments of the present disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

By virtue of the present disclosure, in one or more embodiments a method is provided establishing at least one visible signal configured to illuminate during a normal state of a vehicle and initiating a visible nuisance via the at least one visible signal in response to at least one detected alarm state wherein the at least one visible signal is a light associated with normal vehicle operation.

A system comprising a flasher interface module for a vehicle having factory lights, comprising: a plurality of input and output ports corresponding to the factory lights of the vehicle; a plurality of leads corresponding to each of the input and output ports, whereby the input and output ports of the module operate independently of the vehicle such that factory lights are controlled by the module; and wherein the system shuts off the module when a brake light or turn signal on the vehicle is activated.

A vehicle, comprising: at least one lighting device configured to provide a signal during a normal state of a vehicle; and a processor configured to detect an alarm state of the vehicle, and initiate a visible nuisance via the at least one visible signal in response to at least the detected alarm state, wherein the processor is configured to flash the at least one visible signal in a manner not associated with normal vehicle operation.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A vehicle warning lighting system (VWLS) comprising:
a flash module having a plurality of light power outputs that each provides a strobed light power signal;
a VWLS interface comprising an isolating interconnection between each one of the plurality of light power outputs of the flash module and an interrupted conductor in a vehicle between a body control module and a respective exterior light, wherein the isolating interconnection adds a light power signal from a body control module (BCM) of the vehicle to the respective exterior light and a strobed light power signal from the flash module to the respective exterior light while isolating the BCM and flash module from each other; and
a flash module user control in electrical communication with the flash module to enable the strobed light power signal,
wherein the VWLS interface comprises one or more power adders that combine two light power signals respectively from the BCM and FM to overlay an additional pattern from the FM on at least light without impairing a primary function of the light when illuminated by the BCM, wherein the light is illuminated simultaneously by both the light power signal from the BCM and the strobed light power signal from the flash module.

2. The VWLS of claim 1, wherein the isolating interconnection comprises an inserted one-way diode between the respective output of the BCM and a union of the isolating interconnection and comprises a one-way diode between each light power output of the flash module and a corresponding union in the corresponding interrupted conductor in the vehicle.

3. The VWLS of claim 2, wherein the isolating interconnect comprises a connector adapter that is inserted between an electrical receptacle of the BCM and a connector of a wire bundle that comprises the conductors to each of the exterior lights of the vehicle.

4. A method of installing a vehicle warning lighting system on a vehicle, the method comprising:
for each of a plurality of exterior light circuits in a vehicle:
inserting in an electrical conductor a one-way diode in series with conductor union between a body control module (BCM) and at least one of more than one exterior vehicle light;
for each of the conductor unions, electrically connecting a respective output of a flash module (FM) to a respective conductor union via a one-way diode, wherein each one-way diodes allows a light power signal to illuminate the one exterior vehicle light from either or both of BCM and FM while presenting a high input impedance to prevent BCM and FM from interfering with each other;

mounting a flash user control that is accessible to the user of the vehicle;

electrically connecting the flash user control to a control input of the FM; and electrically connecting a power input of the FM to battery power of the vehicle, wherein the external light circuits are illuminated simultaneously by both the light power signal from the BCM and the strobed light power signal from the flash module.

5. A vehicle warning lighting system (VWLS) comprising:
a body control module (BCM) of the vehicle;
a flash module having a plurality of light power outputs that each provides a strobed light power signal;
a VWLS interface comprising an isolating interconnection between each one of the plurality of light power outputs of the flash module and an interrupted conductor in a vehicle between a body control module and a respective exterior light, wherein the isolating interconnection adds a light power signal from the BCM to the respective exterior light and a strobed light power signal from the flash module to the respective exterior light while isolating the BCM and flash module from each other; and
a flash module user control in electrical communication with the flash module to enable the strobed light power signal; and
an override feature that automatically over powers the flash module when at least one of: (i) a high beam light on the vehicle is activated; (ii) when a brake light on the vehicle is activated; (iii) and when a turn signal light on the vehicle is activated by the BCM.

6. The VWLS of claim 1, further comprising a brake light having a maximum illumination that can produce an additional pattern of strobing lights overlaid on a high illumination level that does not impair the primary function of the brake light.

7. The VWLS of claim 5, wherein:
the BCM responds to a high beam light selection by a driver to illuminate the high beam light of the vehicle; and
the override feature automatically responds to the illumination of the high beam light by the BCM by over powering the flash module.

8. The VWLS of claim 5, wherein:
the BCM responds to a braking action by a driver to illuminate the brake light of the vehicle; and
the override feature automatically responds to the illumination of the brake light by the BCM by over powering the flash module.

9. The VWLS of claim 5, wherein:
the BCM responds to a turn signal action by a driver to illuminate the turn signal light of the vehicle; and
the override feature automatically responds to the illumination of the turn signal light by the BCM by over powering the flash module.

* * * * *